(12) United States Patent
Yau et al.

(10) Patent No.: US 12,429,064 B2
(45) Date of Patent: Sep. 30, 2025

(54) METHOD OF USING A LABYRINTH SEAL FOR SEALING A TURBOMACHINE FOR OXYGEN RICH PROCESS FLUIDS

(71) Applicant: L'Air Liquide, Societe Anonyme pour l'Etude et l'Exploitation des Procedes Georges Claude, Paris (FR)

(72) Inventors: Edward Yau, Houston, TX (US); Phong Mai, Houston, TX (US); Bao Ha, Houston, TX (US); Alain Guillard, Houston, TX (US); Michael A. Turney, Houston, TX (US)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 18/634,238

(22) Filed: Apr. 12, 2024

(65) Prior Publication Data

US 2024/0344464 A1 Oct. 17, 2024

Related U.S. Application Data

(60) Provisional application No. 63/458,729, filed on Apr. 12, 2023.

(51) Int. Cl.
*F04D 29/16* (2006.01)
*F01D 11/02* (2006.01)
(Continued)

(52) U.S. Cl.
CPC ............ *F04D 29/161* (2013.01); *F01D 11/02* (2013.01); *F01D 11/04* (2013.01); *F16J 15/453* (2013.01); *F05D 2240/55* (2013.01)

(58) Field of Classification Search
CPC ........ F04D 29/161; F01D 11/02; F01D 11/04; F16J 15/453; F05D 2240/55
See application file for complete search history.

(56) References Cited

U.S. PATENT DOCUMENTS 3,537,713 A * 11/1970 Matthews ............... F16J 15/445
277/936
5,029,876 A 7/1991 Orlando et al.
(Continued)

FOREIGN PATENT DOCUMENTS

CH 702 606 7/2011
CH 706 862 2/2014
(Continued)

OTHER PUBLICATIONS

International Search Report and Written Opinion for PCT/US2024/024305, mailed Jul. 26, 2024.

*Primary Examiner* — Brian Christopher Delrue
(74) *Attorney, Agent, or Firm* — Elwood L. Haynes (57) ABSTRACT

A method for sealing an oxygen-rich process gas within a compressor or expander, including providing a rotor component having a rotating element and providing a stator component having a stationary element. Introducing a seal gas into the first sealing zone and introducing a buffer gas into the second sealing zone. Wherein at least a portion of the rotating element includes the teeth of a first labyrinth seal. Wherein the first labyrinth seal is part of a first sealing zone. Wherein at least a portion of the stationary element includes the teeth of a second labyrinth seal. And wherein the second labyrinth seal is part of a second sealing zone.

4 Claims, 8 Drawing Sheets

(51) Int. Cl.
*F01D 11/04* (2006.01)
*F16J 15/453* (2006.01)

(56) References Cited

U.S. PATENT DOCUMENTS

| | | | |
|---|---|---|---|
| 6,131,910 A | 10/2000 | Bagepalli et al. | |
| 6,499,742 B1* | 12/2002 | Zhou | F16J 15/445 |
| | | | 277/355 |
| 8,356,974 B2* | 1/2013 | Inomata | F01D 19/00 |
| | | | 415/118 |
| 8,360,712 B2 | 1/2013 | Deo et al. | |
| 9,182,311 B2 | 11/2015 | Clark et al. | |
| 9,353,647 B2* | 5/2016 | Bordne | F01D 25/20 |
| 10,570,768 B2 | 2/2020 | Morinaka | |
| 10,690,251 B2 | 6/2020 | Saha et al. | |
| 2010/0008756 A1* | 1/2010 | Inomata | F01D 25/10 |
| | | | 415/173.5 |
| 2011/0182719 A1* | 7/2011 | Deo | F16J 15/442 |
| | | | 415/173.1 |
| 2012/0091662 A1* | 4/2012 | Neeli | F01D 11/02 |
| | | | 277/420 |
| 2014/0064909 A1 | 3/2014 | Trivedi et al. | |
| 2017/0114659 A1* | 4/2017 | Imbourg | F04D 29/563 |
| 2021/0048035 A1* | 2/2021 | Elcock | F01D 11/04 |
| 2022/0120189 A1* | 4/2022 | Perez | F01D 15/005 |
| 2022/0213896 A1* | 7/2022 | Wilson | F04D 17/122 |

FOREIGN PATENT DOCUMENTS

| | | |
|---|---|---|
| DE | 11 2016 003036 | 1/2023 |
| EP | 3 486 433 | 5/2019 |

\* cited by examiner

METHOD OF USING A LABYRINTH SEAL FOR SEALING A TURBOMACHINE FOR OXYGEN RICH PROCESS FLUIDS

CROSS REFERENCE TO RELATED APPLICATIONS

This application claims the benefit of priority under 35 U.S.C. § 119 (a) and (b) to U.S. Provisional Patent Application No. 63/458,729, filed Apr. 12, 2023, the entire contents of which are incorporated herein by reference.

BACKGROUND

Figure 1:
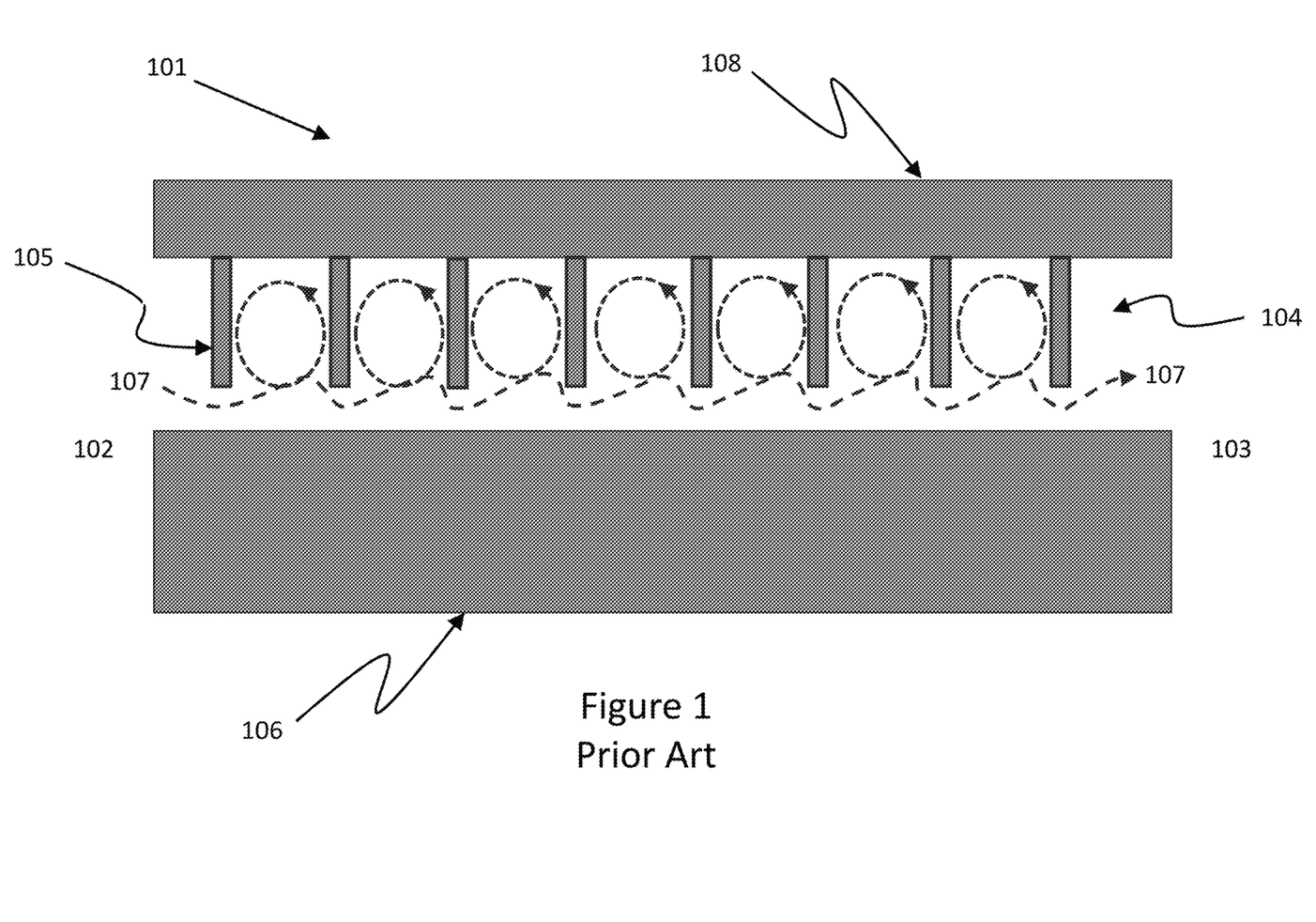
FIG. 1 is a schematic representation of one embodiment of a labyrinth seal as known in the art.
Figure 2:
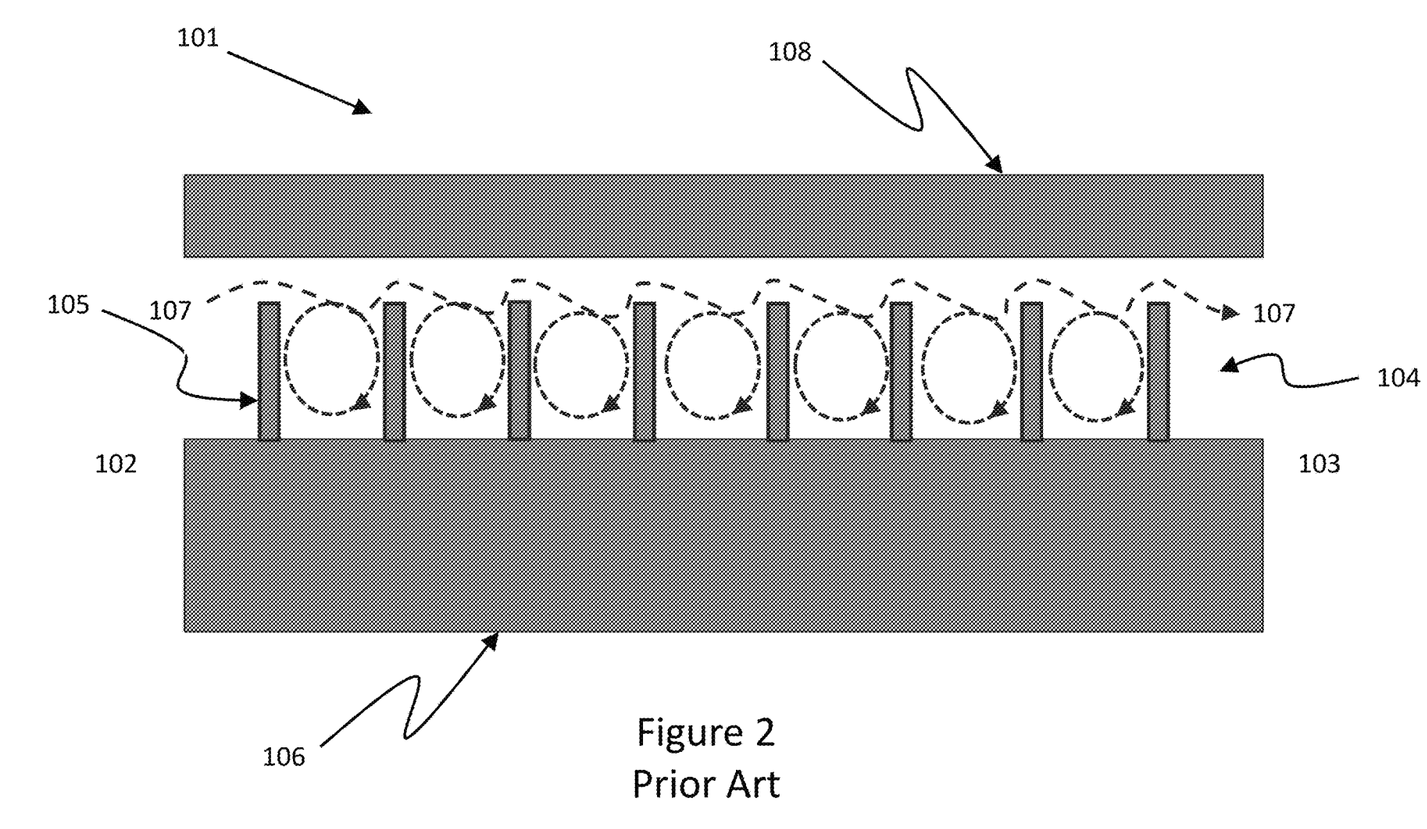
FIG. 2 is another schematic representation of one embodiment of a labyrinth seal as known in the art.
Figure 3:
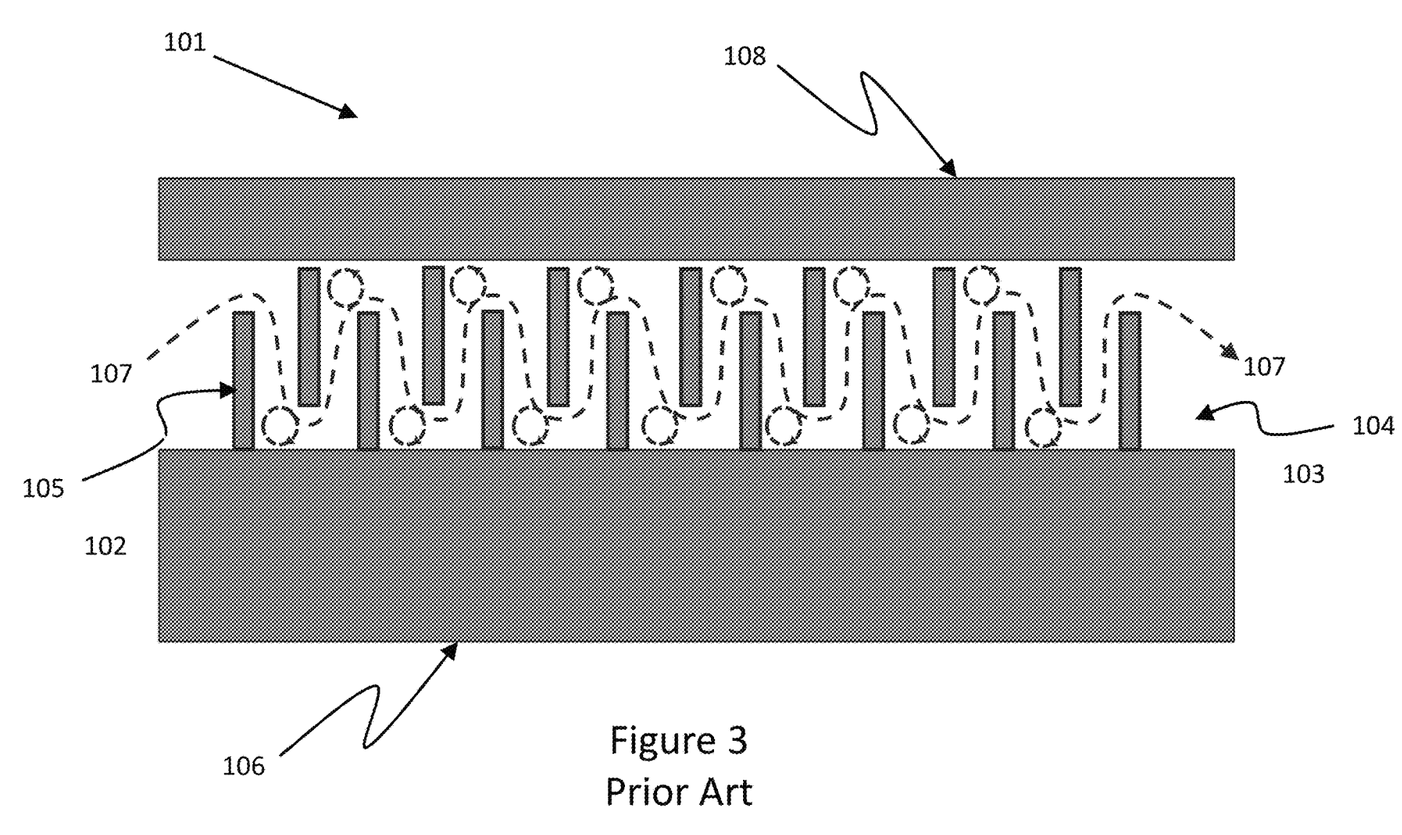
FIG. 3 is another schematic representation of one embodiment of a labyrinth seal as known in the art.

As illustrated in FIGS. 1-3, labyrinth seals 101, which are commonly found in industrial gas turbines and compressors, control the leakage from high-pressure region 102 to low-pressure region 103. A typical labyrinth seal 101 comprises cavities 104 and teeth 105 facing a spinning rotor 106. Torturous gas flow 107 path through teeth 105 induces a pressure drop and restricts leakage. Teeth 105 are either on rotor 106, as shown in FIG. 1, or on stator 108, as shown in FIG. 2. An interlocking design has teeth 105 on rotor 106 as well as stator 108, as shown in FIG. 3. Leakage depends on the seal geometry (i.e. tooth shape, pitch/depth, and number of teeth), gas type, and operating shaft speed, pressure and temperatures. The type of seals used also yield stress forces acting on the rotor and may produce mechanical instability into a rotating system.

The design of labyrinth seal systems is further limited when the process gas to be expanded and/or compressed is oxygen rich (>23.5% O2). The reactivity of oxygen significantly increases the risk of ignition and fire. Materials that may not burn in normal air may burn vigorously in an oxygen rich environment. Also, sparks normally regarded as harmless in air may cause fires in an oxygen rich environment.

In addition, ignition and burning in an oxygen rich environment is further enhanced in materials with thin and/or sharp edges. Stator 108 and rotor 106 are commonly composed of different materials for mechanical reasons.

Figure 4:
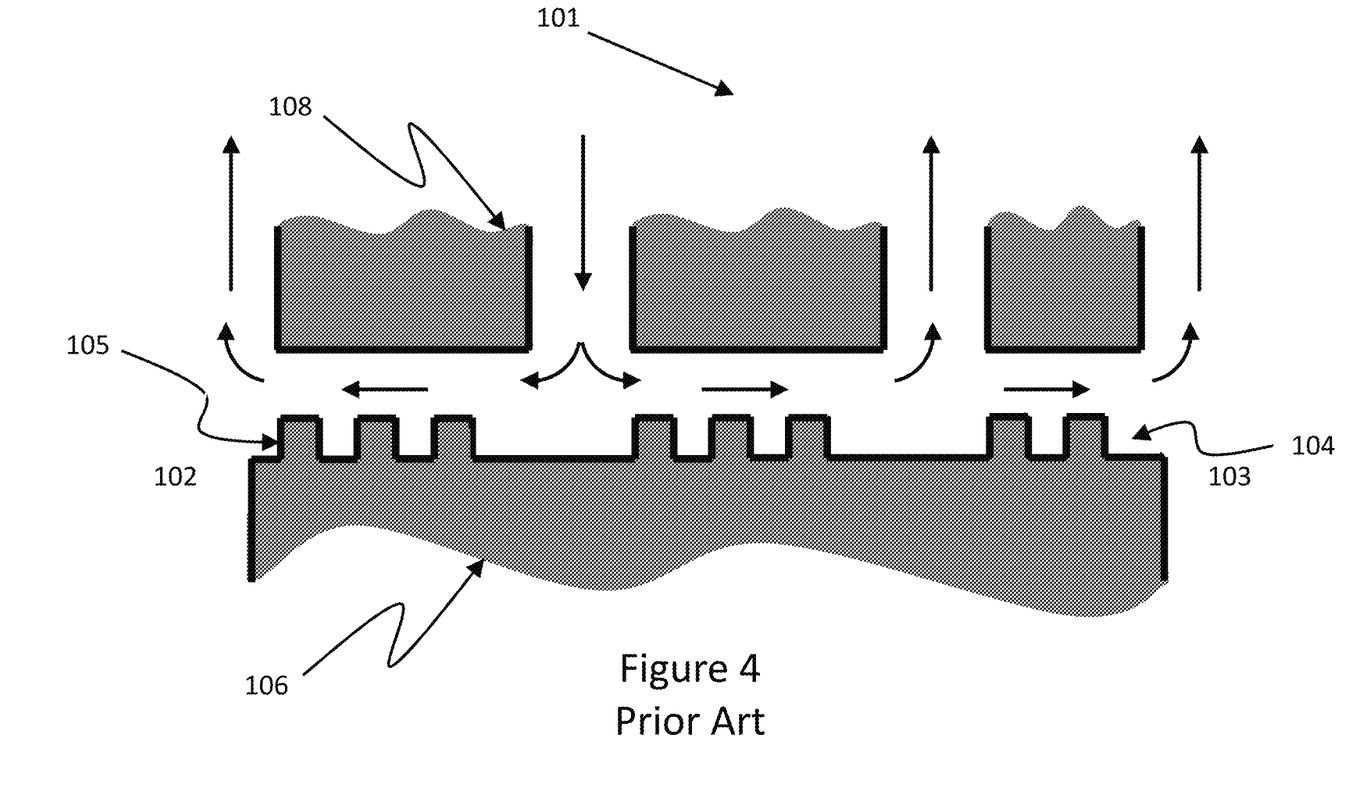
FIG. 4 is another schematic representation of one embodiment of a labyrinth seal as known in the art.
Figure 5:
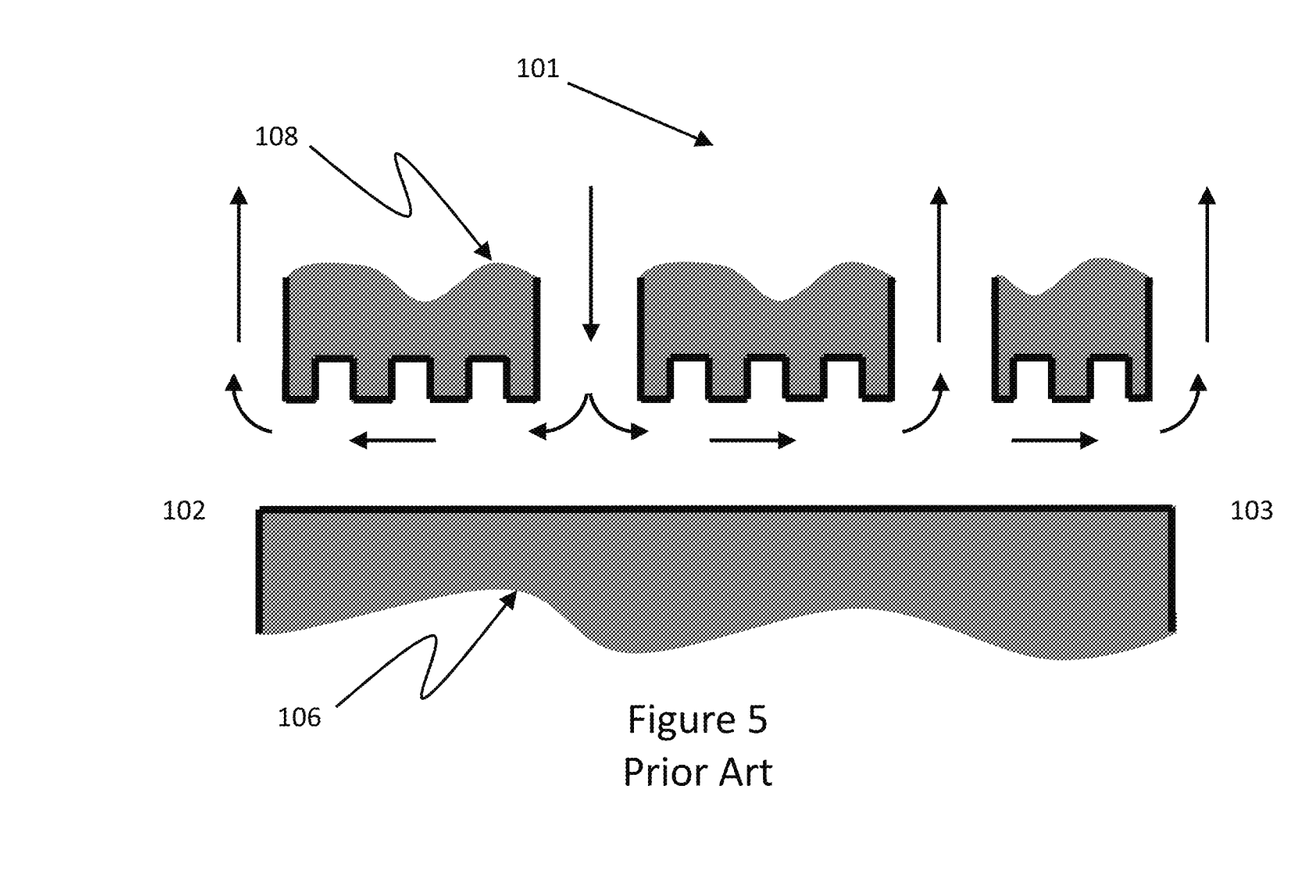
FIG. 5 is another schematic representation of one embodiment of a labyrinth seal as known in the art.

A typical design for a labyrinth seal 101 that is intended to be used in air and nitrogen service, but not recommended and acceptable for oxygen-rich service, is shown in FIG. 4 and FIG. 5. In this design, rotor 106 is typically made from stainless steel, and stator 108, which, in this design, comprises multiple sections, is typically made from brass. One concern is the possibility that unintended vibrations or deflections of the rotor may cause the thin edges of teeth 105 to potentially produce sparks which may be catastrophic in an oxygen-rich service. Also, thin edges adsorb heat energy faster and therefore reach ignition temperature faster than larger flat surfaces.

It is the object of the present application to provide an improved mechanical seal apparatus for turbomachinery. The objective is to provide a design which efficiently prevents leakage of process fluid and/or oil in a mechanically robust rotating machine wherein potential for ignition of oxygen rich process fluid is minimized.

SUMMARY

A method for sealing an oxygen-rich process gas within a compressor or expander, including providing a rotor component having a rotating element and providing a stator component having a stationary element. Introducing a seal gas into the first sealing zone and introducing a buffer gas into the second sealing zone. Wherein at least a portion of the rotating element includes the teeth of a first labyrinth seal. Wherein the first labyrinth seal is part of a first sealing zone. Wherein at least a portion of the stationary element includes the teeth of a second labyrinth seal. And wherein the second labyrinth seal is part of a second sealing zone.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

101=labyrinth seal
102=high-pressure region
103=low-pressure region
104=cavities
105=teeth
106=rotor
107=torturous gas path
108=stator
601=labyrinth seal
602=high-pressure region
603=low-pressure region
604=cavities
605a=stator teeth
605b=rotor teeth
606a=rotor
606b=rotor insert
608a=first stator segment
608b=second stator segment
608c=third stator segment
608d=fourth stator segment
609=inlet seal gas stream
609a=first portion of seal gas stream
609b=second portion of seal gas stream
609c=outlet seal gas stream
610=inlet buffer gas stream
610a=first portion of buffer gas stream
610b=second portion of buffer gas stream
610c=outlet buffer gas stream
611=combined gas outlet stream
701=first sealing zone
702=second sealing zone

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, the term "rotor" is defined as the rotating part of the machine.

As used herein, the term "stator" is defined as the non-moving, fixed part of the machine.

As used herein, the term "labyrinth seal" is defined as a type of mechanical seal that provides a torturous path to help prevent leakage.

As used herein, the term "labyrinth teeth" is defined as a number of sharp-edged flow restrictors.

As used herein, the term "oxygen rich" is defined as a gas stream with greater than 23.5% oxygen by mass.

A new and unforeseen arrangement is proposed which simultaneously employs both teeth on rotor and teeth on stator for a robust mechanical design with enriched oxygen fluid. Wherein, the labyrinth system comprises an oxygen rich zone and a non-oxygen rich zone. In the oxygen rich zone labyrinth teeth are present on the stator in exempt (nonflammable) material. In the non-oxygen rich zone, the labyrinth teeth are present on the rotor comprising a material which is more flammable than the teeth used in the oxygen rich zone.

Figure 6:
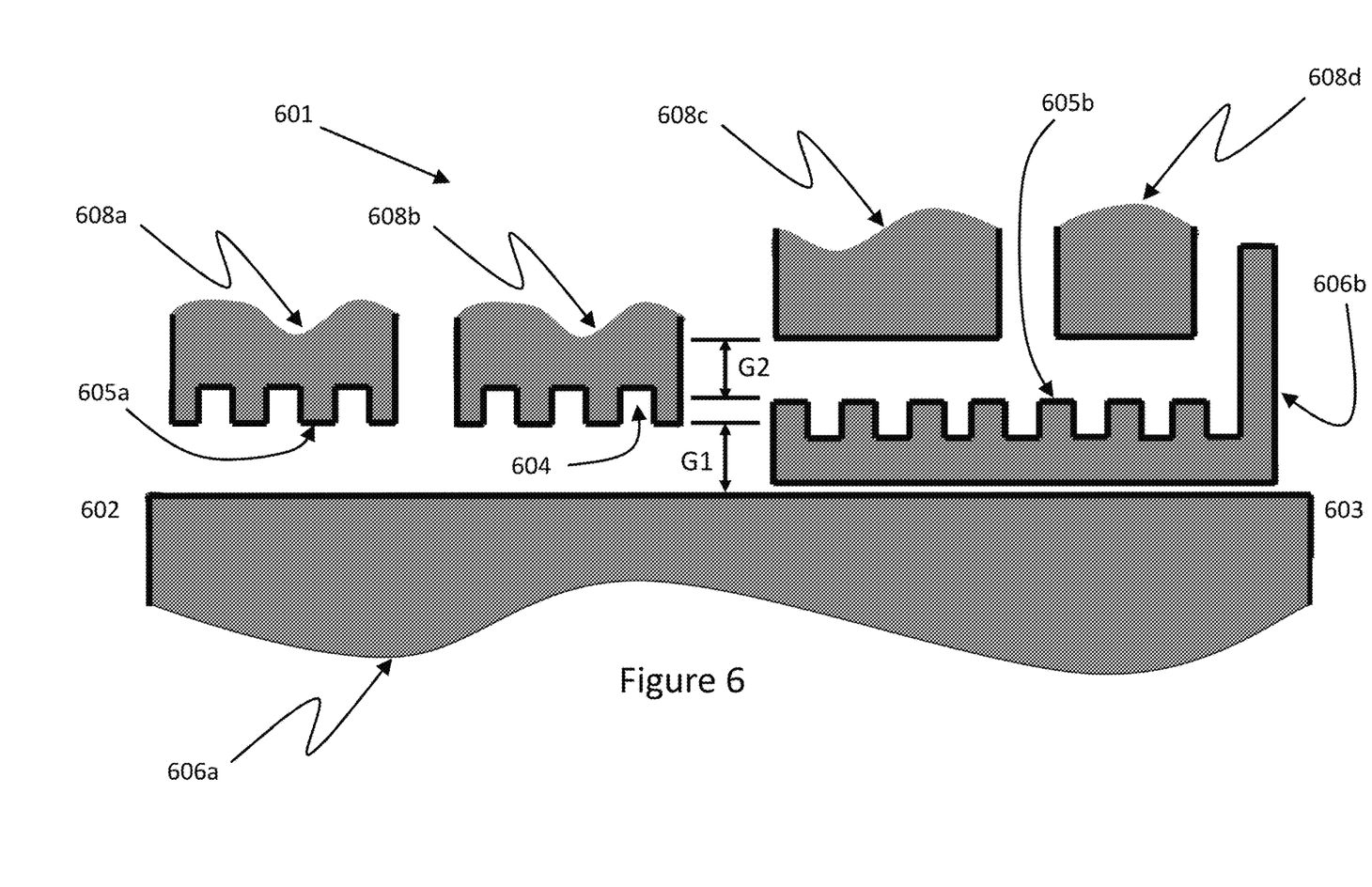
FIG. 6 is a schematic representation of a labyrinth seal according to one embodiment of the present invention.

Turning to FIG. 6, one embodiment of the present invention is presented. The gas seal as described in the present invention may be used at cryogenic temperatures, or may be used at ambient or warm temperatures. It is noted that spacing (clearance gap) G1 and G2 are exaggerated for clarity. Stator 608 comprises at least four components, 608a, 608b, 608c, and 608d. Toothed components 608a and 608b have labyrinth teeth 605a. Stator components 608c and 608d do not have labyrinth teeth. One or more of stator components 608a, 608b, 608c, and 608d may be made of any appropriate material known to one of ordinary skill in the art. One or more of stator components 608a, 608b, 608c, and 608d may be made of any appropriate material known to one of ordinary skill in the art. One or more of stator components 608a, 608b, 608c, and 608d may be made of brass.

Rotor 606 comprises at least two components, 606a and 606b. Rotor component 606a does not have labyrinth teeth. Rotor component 606b has labyrinth teeth 605b. Rotor component 606b is rigidly, but removably attached to rotor component 606a. Rotor component 606b may be press-fit to rotor component 606a. Rotor components 606a and 606b may be made of any appropriate material known to one of ordinary skill in the art. Rotor components 606a and 606b may be made of any appropriate material known to one of ordinary skill in the art. Rotor components 606a and 606b may be made of stainless steel.

Figure 7:
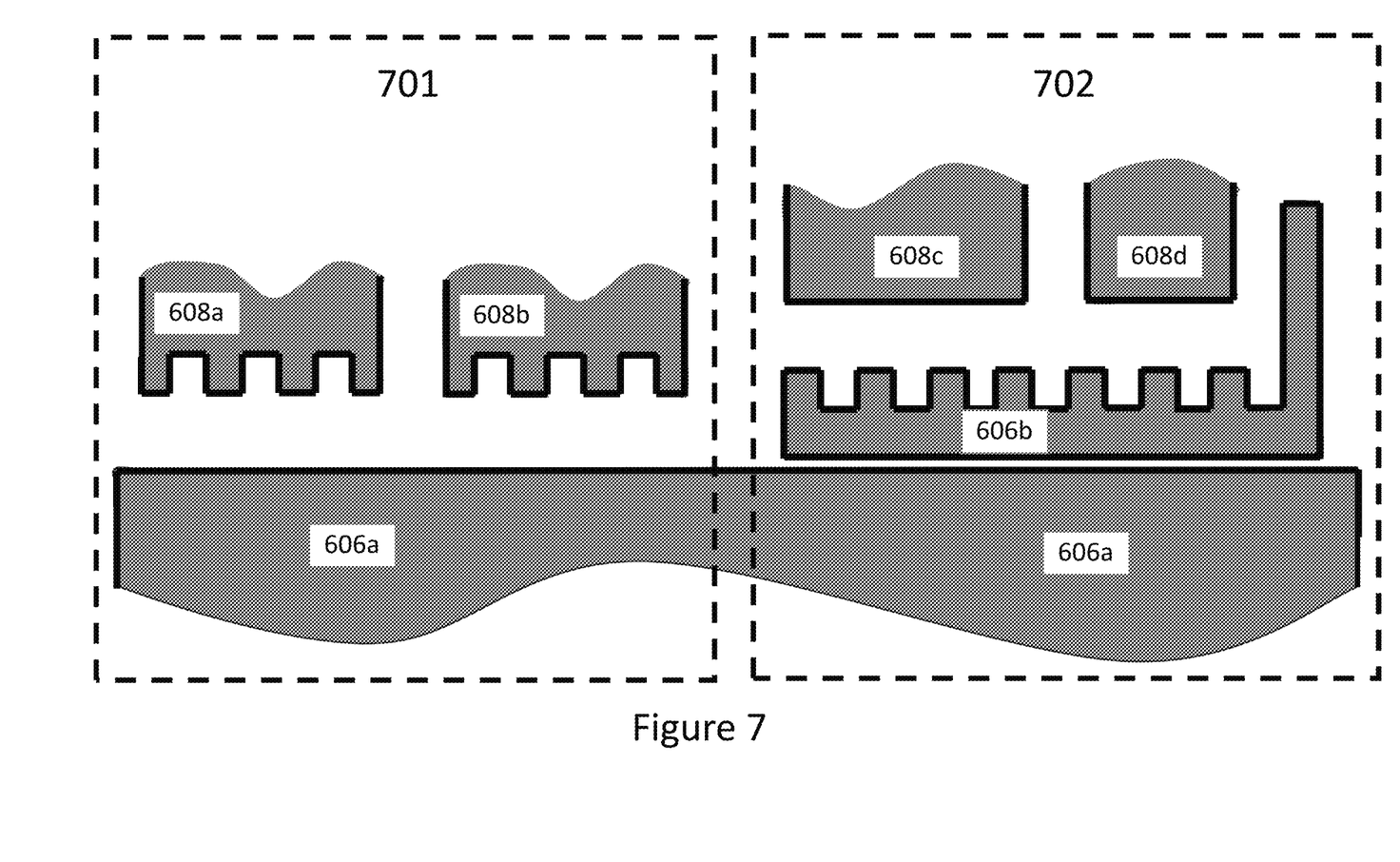
FIG. 7 is a schematic representation of a labyrinth seal according to one embodiment of the present invention.

As indicated in FIG. 7, Toothed components 608a and 608b and rotor component 606a are part of first sealing zone 701. Stator components 608c and 608d and toothed rotor component 606b are part of second sealing zone 701. First sealing zone 701 is configured to be safe and compatible with oxygen-rich fluids. Appropriate materials for first sealing zone 701 include brass, copper-nickel alloys, Elgiloy, and polytetrafluoroethylene. The specific compatible material may be used on any individual component or a combination of one or more components. Multiple compatible materials may be used in the overall component. First sealing zone 701 is preferably made of brass. Second sealing zone 702 is not configured to necessarily be compatible with oxygen-rich fluids. Appropriate materials for second sealing zone 702 include. aluminum, stainless steel, and carbon steel. Second sealing zone 702 is preferably made of stainless steel.

Figure 8:
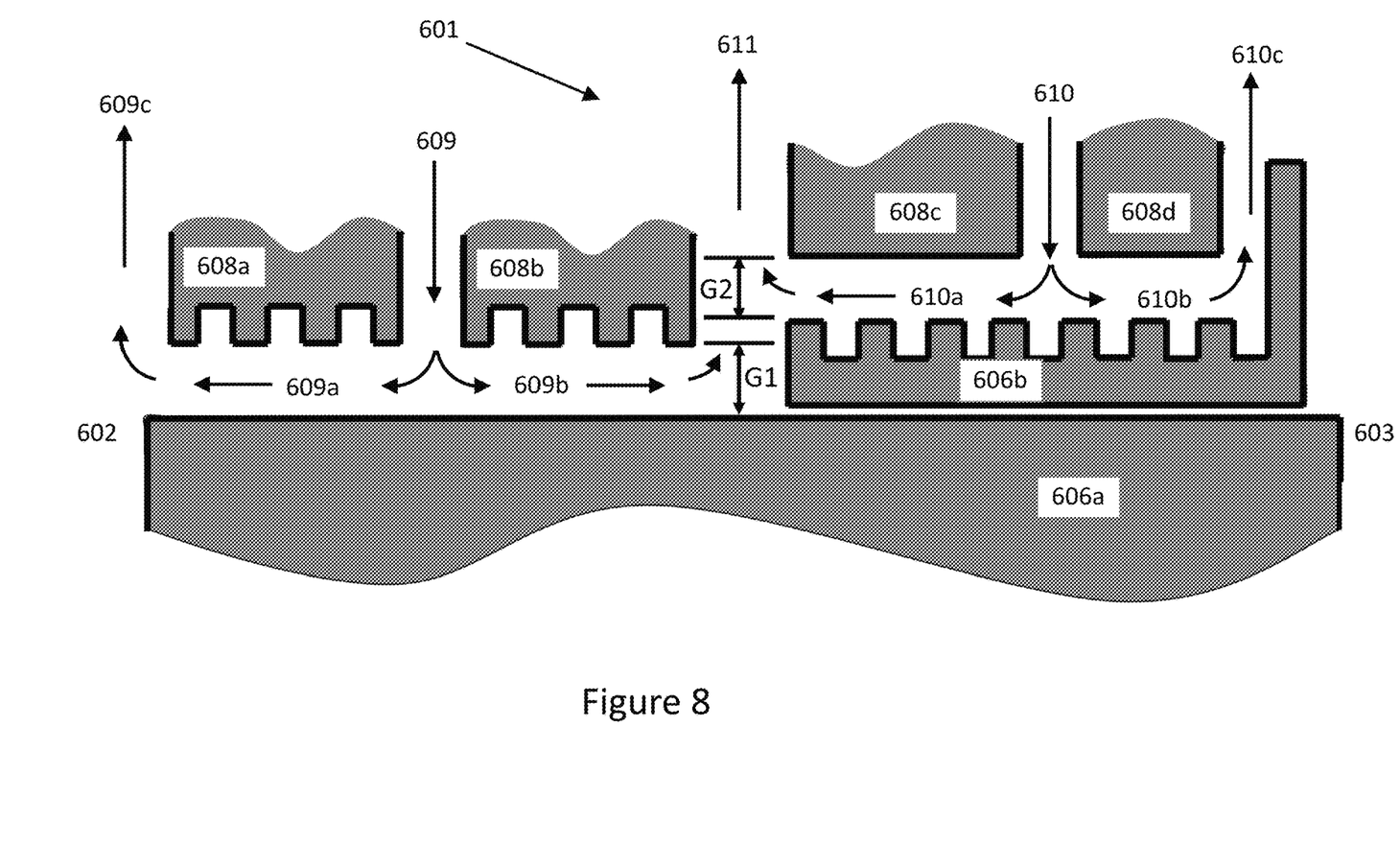
FIG. 8 is a schematic representation of a labyrinth seal according to one embodiment of the present invention.

Turning to FIG. 8, the flow of seal gas stream 609 and buffer gas stream 610 is illustrated. Seal gas stream 609 may be any appropriate gas known to one of ordinary skill in the art. Seal gas stream 609 may be nitrogen. Seal gas stream 609 enters through a channel between toothed stator components 608a and 608b. A first portion, seal gas stream 609a, then passes through clearance gap G1, and thus in between toothed stator component 608a and rotor component 606a, thus providing a portion of the component sealing. Seal gas stream 609c then exits the system. As seal gas stream 609c exits the system, it has become blended with at least a part of the fluid that is being compressed.

A second portion, seal gas stream 609b, then passes through gap G1, and thus in between toothed stator component 608b and rotor component 606a, thus providing another portion of the component sealing. Seal gas stream 609b then combines with exiting buffer gas stream 610a, discussed below, and exits the system. This portion of labyrinth seal 601 is potentially exposed to highly oxygen-enriched process gas, and thus the toothed components are made of brass and oxygen-safe seal gas streams are utilized.

Buffer gas stream 610 may be any appropriate gas known to one of ordinary skill in the art. Buffer gas stream 610 may be nitrogen. Seal gas stream 609 enters through a channel between stator components 608c and 608d. A first portion, buffer gas stream 610a, then passes through gap G2, and thus in between stator component 608c and toothed rotor component 606b, thus providing another portion of the component sealing. Seal gas stream 610a combines with exiting seal gas stream 609b, thus forming combined outlet gas outlet stream 611, which then exits the system.

A second portion, buffer gas stream 610b, then passes through clearance gap G2, and thus in between stator component 608d and toothed rotor component 606b, thus providing another portion of the component sealing. Buffer gas stream 610c then exits the system. This portion of labyrinth seal 601 is potentially unexposed to highly oxygen-enriched process gas, and thus the toothed components are made of stainless steel and oxygen-safe seal gas streams is not required.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for sealing an oxygen-rich process gas within a compressor or expander, comprising:
   providing a rotor component comprising a rotating element,
wherein at least a first rotating portion of the rotating element has no labyrinth seal teeth,
wherein at least a second rotating portion of the rotating element comprises a rotot insert, wherein the rotor insert comprises labyrinth seal teeth,
   providing a stator component comprising a stationary element,
wherein at least a first stationary portion of the stationary element comprises labyrinth seal teeth,
wherein at least a second stationary portion of the stationary element has no labyrinth seal teeth,
wherein the first rotating portion and the first stationary portion comprise a first sealing zone,
wherein the second rotating portion and the second stationary portion comprise a second sealing zone,
   introducing a seal gas into the first sealing zone, and
   introducing a buffer gas into the second sealing zone.

2. The method of claim 1, wherein the rotating element and the stationary element are made of different materials.

3. The method of claim 1, wherein the first sealing zone is comprises material selected from the group consisting of brass, copper-nickel alloys, Inconel, Elgiloy, and polytetrafluoroethylene(Teflon).

4. The method of claim 1, wherein the second sealing zone comprises material selected from the group consisting of aluminum, stainless steel, and carbon steel.

* * * * *